United States Patent
Dinges et al.

(10) Patent No.: US 6,915,174 B2
(45) Date of Patent: Jul. 5, 2005

(54) AUTOMATION INSTALLATION

(75) Inventors: Clemens Dinges, Obermichelbach (DE); Joachim Feld, Nürnberg (DE); Ronald Lange, Fürth (DE); Michael Schlereth, Wilhermsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 125 days.

(21) Appl. No.: 10/381,785

(22) PCT Filed: Sep. 17, 2001

(86) PCT No.: PCT/DE01/03579
§ 371 (c)(1),
(2), (4) Date: Mar. 28, 2003

(87) PCT Pub. No.: WO02/27416
PCT Pub. Date: Apr. 4, 2002

(65) Prior Publication Data
US 2004/0044420 A1 Mar. 4, 2004

(30) Foreign Application Priority Data
Sep. 29, 2000 (DE) .......................................... 100 48 743

(51) Int. Cl.⁷ .............................................. G05B 15/00
(52) U.S. Cl. ............................ 700/83; 700/9; 700/17; 700/18; 700/86; 700/87; 709/200; 709/217; 709/219; 709/220

(58) Field of Search .............................. 700/17, 18, 23, 700/65, 66, 83, 86, 87, 88, 9, 67; 709/200, 217, 219, 220, 228

(56) References Cited

U.S. PATENT DOCUMENTS

| | | | |
|---|---|---|---|
| 4,944,033 A | * | 7/1990 | Erni ........................... 700/130 |
| 5,777,876 A | | 7/1998 | Beauchesne |
| 5,786,993 A | * | 7/1998 | Frutiger et al. ............... 700/83 |
| 5,805,442 A | | 9/1998 | Crater et al. |
| 6,061,603 A | | 5/2000 | Papadopoulos et al. |

FOREIGN PATENT DOCUMENTS

| | | |
|---|---|---|
| DE | 44 13 836 | 10/1995 |
| EP | 0 822 473 | 2/1998 |
| EP | 0 825 506 | 2/1998 |
| WO | 00/20992 | 4/2000 |
| WO | 00/52536 | 9/2000 |

* cited by examiner

*Primary Examiner*—Ramesh Patel
(74) *Attorney, Agent, or Firm*—Staas & Halsey LLP

(57) ABSTRACT

Information available in an automation installation can be accessed via the automation installation by a computer that is coupled to the automation installation. The computer can access, via an interface, a search machine stored in the automation installation. The search machine selects the information available in the automation installation according to at least one criterion defines by an alphanumeric character string.

14 Claims, 3 Drawing Sheets

FIG 3
```
search:   valve
hits:     valve 1    block 1    oil in      open
          valve 2    block 1    oil out     open
          valve 3    block 1    water in    defect
          valve 4    block 2    steam out   closed
            ⋮
```
19
FIG 4
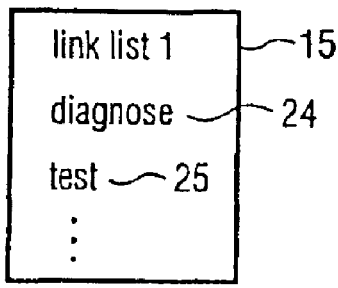
link list 1 — 15
diagnose — 24
test — 25
FIG 5
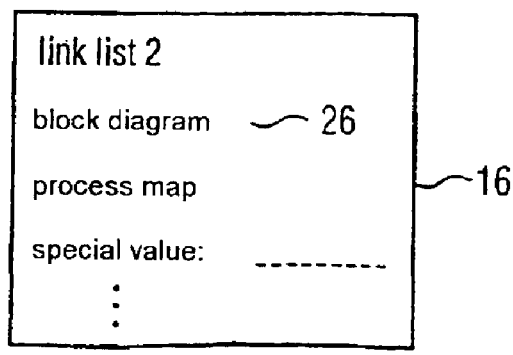
link list 2
block diagram — 26
process map
special value: ---------
⋮
— 16

AUTOMATION INSTALLATION

CROSS REFERENCE TO RELATED APPLICATIONS

This application is based on and hereby claims priority to German Application No. 100 48 743.2 filed on Sep. 29, 2000, the contents of which are hereby incorporated by reference.

BACKGROUND OF THE INVENTION

1. Field of Invention

The present invention relates to an automation installation having an interface which a computer coupled to the automation installation can use to retrieve information about the automation installation which is available in the automation installation.

2. Description of the Related Art

Such automation installations are already known. By way of example, reference is made to U.S. patent specifications U.S. Pat. No. 5,805,442 and 6,061,603.

When accessing the information available in the automation installation, it is often necessary to access particular information specifically. It must therefore be possible to select which information will be accessed. However, it is not known beforehand which data need to be accessed. In particular, a situation can even arise in which a user on the connected computer does not even know how the automation installation which he is accessing is configured, or other such matters. It is therefore necessary to provide the user with a simple way of accessing the information available in the automation installation, so to speak in a tailor-made manner.

SUMMARY OF THE INVENTION

An object of the present invention is to provide the user with such an opportunity. In particular, the intention is also to allow him to select the information according to his wishes.

This object is achieved by virtue of the interface being able to be used from the computer to call up a search engine which is stored in the automation installation and which can be used to select the information about the automation installation which is available in the automation installation on the basis of at least one criterion, with the criterion for the automation installation being able to be prescribed in the form of an alphanumeric character string using the computer.

This therefore allows the user to make appropriate inputs in order first to find out the information available in the automation installation as required and then to examine it if appropriate.

If the interface can also be used to call up at least one connection list, hierarchically graduated access to individual information can easily be implemented. In this case, the connection list(s) preferably include(s) non-installation-specific operating functions, installation-specific operating functions and/or installation-specific details other than operating functions.

If the interface can also be used to call up a help function, even users who are not generally familiar with the automation installation or automation installations in question can quickly communicate with the automation installation on a specific basis in a simple and secure manner.

If the interface can also be used to call up an e-mail function, it is a simple matter to send an e-mail to another person coupled to the automation installation.

If the computer can also use the interface to store a message in the automation installation, which message can be retrieved via the interface by the computer or by another computer coupled to the automation installation during subsequent access to the automation installation, a message can be left for another user even without an e-mail function. In this context, depending on the message, retrieval of the message can be access-protected or not.

If the message is automatically erased by the automation installation after a storage time has elapsed, the storer or the retriever of the message does not need to be concerned with erasing the message.

If access to the automation installation by the computer is password-protected, this prevents unauthorized persons from gaining read and/or write access to the automation installation. In this case, access can be subject to graduated enabling. Thus, by way of example, a large section of users can be provided with read access, whereas only a small section of the users are also provided with write access, and altering particularly important data is reserved only for particularly privileged users. This can be implemented, if appropriate, using a user name/password combination customary on computers.

If the automation installation can store messages about states of a technical installation controlled by the automation installation in the automation installation such that the computer can retrieve them via the interface, the information available in the automation installation always reflects the current state of the technical installation.

For standardization reasons, the interface is preferably in the form of an interface to the worldwide web. In particular, the search engine and possibly also the other functions which can be retrieved via the interface is/are integrated in a web portal which, so to speak, is the home page of the automation installation.

BRIEF DESCRIPTION OF THE DRAWINGS

These and other objects and advantages of the present invention will become more apparent and more readily appreciated from the following description of an exemplary embodiment, taken in conjunction with the accompanying drawings of which:

FIGS. 3 to 8 are basic illustrations of various functions which can be called up using the web portal illustrated in FIG. 2

DETAILED DESCRIPTION OF THE PREFERRED EMBODIMENT

Figure 1:
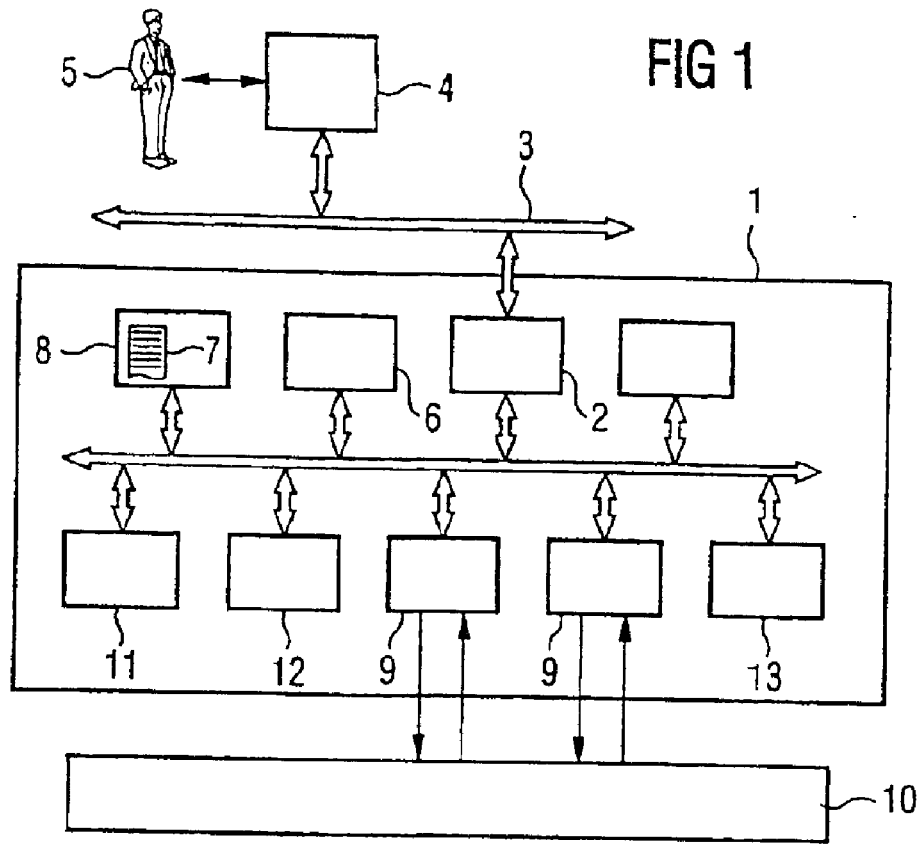
FIG. 1 is a block diagram of a computer system.

Reference will now be made in detail to the preferred embodiments of the present invention, examples of which are illustrated in the accompanying drawings, wherein like reference numerals refer to like elements throughout.

In line with FIG. 1, an automation installation 1 is connected to the worldwide web 3—shown in highly schematic form—via an interface 2. The worldwide web 3 also has a computer 4 connected to it which a user 5 can use to access the worldwide web 3. The computer 4 is thus coupled to the automation installation 1 via the worldwide web 3. Via the interface 2, it is therefore possible to use the computer 4 to retrieve information from the automation installation 1 and to transmit messages, information and/or data to the automation installation 1.

Internally, the automation installation 1 has a processor unit 6 whose manner of operation is determined by a computer program product 7 stored in a read only memory 8, particularly in an electrically erasable read only memory (EEPROM) 8. The way in which the processor unit 6 works will be explained in more detail at a later point.

The automation installation 1 also has input/output units 9 which are used to control and supervise a technical installation 10. To this end, inter alia, a map of the input and output states of the input/output units 9 (process map) is stored in a process map memory 11. A configuration memory 12 also stores information about the installation configuration and concordance information.

The installation information makes it possible to produce a block diagram of the automation installation 1 and/or of the technical installation 10. The concordance information makes it possible to ascertain to which technological unit the individual storage locations provided for the process map in the process map memory 11 correspond. If appropriate, this association can also be made beforehand, which means that it can be ascertained more quickly and can be output via the interface 2 if appropriate. The installation information and the concordance information together form the information about the automation installation 1.

Finally, the automation installation has another interface memory 13. The interface memory 13 stores messages, user names, passwords and the like. This is explained in more detail below.

Figure 2:
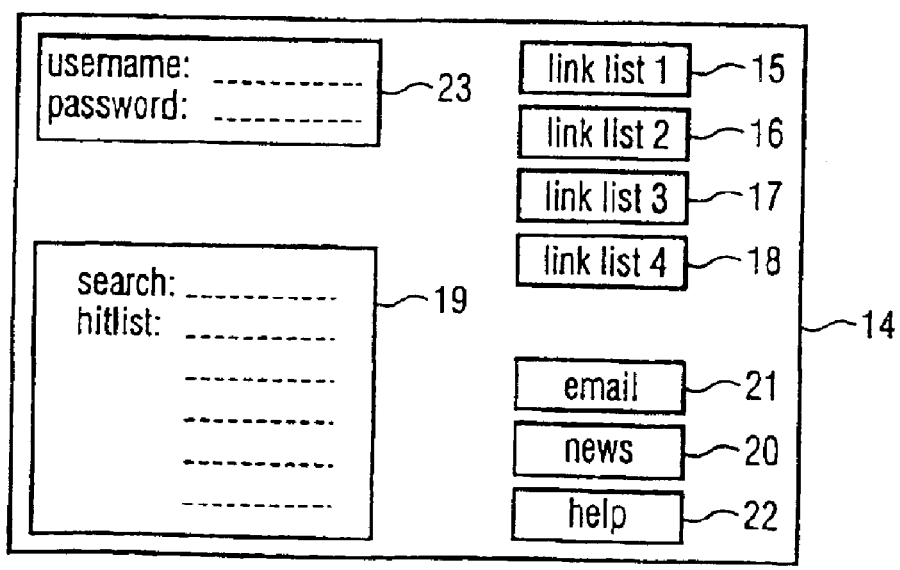
FIG. 2 is a block diagram of a web portal.

Via the interface 2, it is possible to use the computer 4 to call up a web portal 14 which is shown in detail in FIG. 2. The web portal 14 is, so to speak, the home page of the automation installation 1. It is stored in the automation installation 1 as part of the computer program product 7. All the functions 15 to 23 described below are integrated in the web portal 14. They are thus likewise stored in the automation installation 1.

The web portal 14 itself can be called up by any user 5 via the interface 2. To be able to call up functions 15 to 22 shown in the web portal 14, however, an identity check first takes place. To this end, the automation installation 1 uses an identity check block 23 to request a user name and a password. Only if the entered password has been recorded for the entered user name is access to the functions 15 to 22 enabled. Access to the automation installation 1 by the computer 4 is thus password-protected.

In principle, it is sufficient to protect access to the automation installation 1 by the computer 4 using one grade. If appropriate, access can alternatively be enabled on a graduated basis. Thus, by way of example, pure read access can be enabled for a large number of users, whereas additional write access is enabled only for a section of the users 5 and alteration of particularly important functionalities is enabled only for a few particularly privileged users 5.

The individual functions 15 to 22 which can be called up from the web portal 14—provided that there is access authorization—are now described below. These are connection lists 15–18, a search engine 19, a message function 20, an e-mail function 21 and a help function 22.

The computer 4 can be used to prescribe criteria for the search engine 19 in the form of alphanumeric character strings, which criteria can be taken as a basis for selecting the information about the automation installation 1 which is available in the automation installation 1. By way of example, the search engine 19 shown in FIG. 3 can have the "valve" criterion prescribed for it. In this case, the search engine 19 lists all valves, their states and their function. By clicking on one of the hits ascertained in this manner, further information about this valve can then be retrieved from the automation installation 1.

In this case, the "valve" criterion above is obviously just one example. It would also be possible to enter other criteria, e.g. the criterion "open" for listing all open valves or "block 1" for listing all the information about "block 1", for the elements contained therein (servomotors, valves, sensors, etc.). This allows very flexible searching and/or examination of the automation installation 1 or of its configuration and states.

Figure 6:
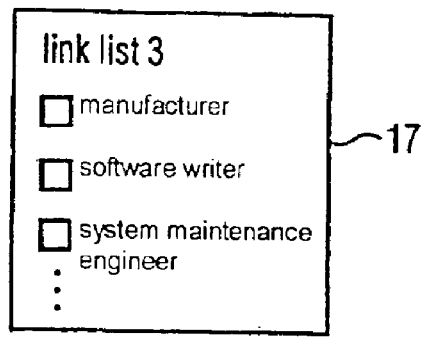

The link lists 15 to 18 can alternatively be used to retrieve non-installation-specific operating functions as shown in FIG. 4, installation-specific operating functions as shown in FIG. 5, installation-specific details other than operating functions as shown in FIG. 6, or current information. Clicking on one of the fields 15 to 18 branches to the respective link list.

The link list 15 for non-installation-specific operating functions includes, in line with FIG. 4, a diagnostic function 24 and a module test 25, for example.

In line with FIG. 5, the installation-specific operating functions include an installation block diagram 26, for example, with the current states of the technical installation 10 being able to be opened in the installation block diagram 26. To show the installation block diagram 26, the process map is thus also used. The messages stored in the automation installation 1 about states of the technical installation 10 (process map) can thus likewise be retrieved by the computer 4.

If appropriate, parts of the technical installation 10 can also be shown and mapped. Even individual values from individual sensors can be specifically picked out. The information about the automation installation 1 which is stored in the automation installation 1 and can be retrieved by the computer 4 via the interface 2 thus includes, in particular, the details about the installation configuration and the process map. If appropriate, other details, e.g. about service states and the like, can also be retrieved from the automation installation 1.

In line with FIG. 6, the installation-specific details other than operating functions include, by way of example, Internet/intranet addresses for the manufacturer, software writer, system maintenance engineer and so on.

The current list 18 includes, by way of example, advice of the update state or of temporarily occurring problems.

By clicking on the e-mail function 21, it is possible to call up an inherently known window for creating and sending an e-mail.

Figure 7:
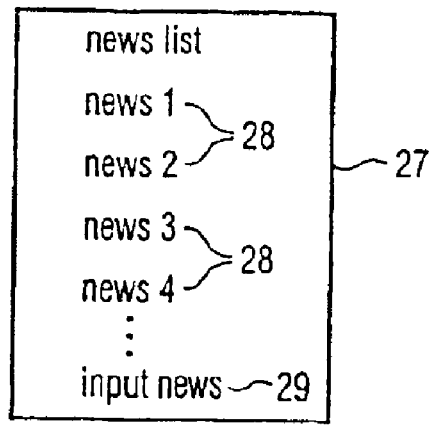

Clicking on the message function 20 retrieves a message window 27 shown in FIG. 7 from the automation installation 1. This contains a list of available messages 28. The messages 28 can be called up individually in an inherently known manner by clicking on them. In this case, callup might be access-protected. This is explained in more detail below in connection with FIG. 8.

The message window 27 shown in FIG. 7 also has a clickable "new message" field 29. Clicking on this field 29 opens a further window 30, which is shown schematically in FIG. 8.

Figure 8:
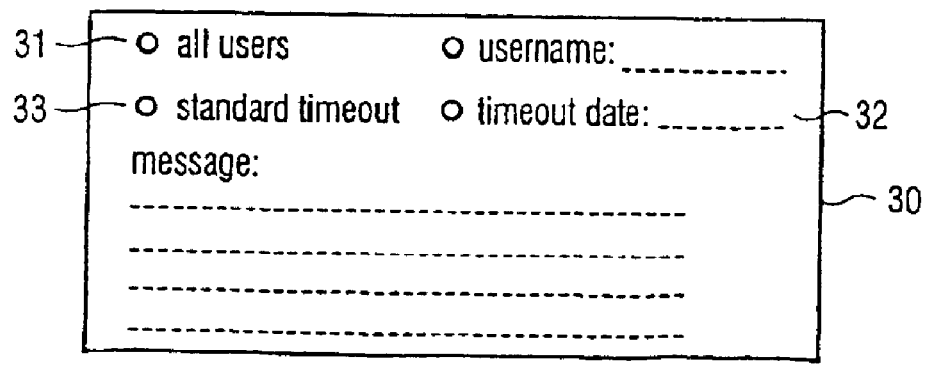

In line with FIG. 8, the message writer can click on a "for all" field 31 or can enter a user name or user code in order to determine whether his message 28 is intended for all users 5 of the automation installation 1 or just for one particular user 5. In the former case, retrieval of the message 28—among the authorized users 5 of the automation installation 1—is not access-protected, otherwise it is access-protected. This is because, in the latter case, the respective message 28 can be retrieved only by the user 5 who is authorized by the user name and the password.

In addition, the user 5 can enter an explicit expiry date into a field 32 or can click on a field 33 for a fixed expiry date (e.g. 14 days after the message 28 is stored) in order to select when his message 28 is automatically erased again by the automation installation 1. This input thus determines a storage time.

Finally, the window shown in FIG. 8 also contains a field in which the actual message 28 (usually text) can be entered. The entered message 28 is then stored in the automation installation 1 by the computer 4 via the interface 4. It can therefore be retrieved by the computer 4 or by another computer coupled to the automation installation 1 during subsequent access to the automation installation 1.

The functions 15 to 21, 23 explained above are essentially intended for a user 5 who is used to handling the web portal 14. If the user 5 does not know what details he can enter into what fields, however, the user 5 needs to, may or can also click on the help function 22. In this case, he is assisted in the use of the web portal 14 in the generally known manner by a help menu.

The inventive form of automation installation 1 provides a simple way of operating the automation installation 1 conveniently using the computer 4.

The invention has been described in detail with particular reference to preferred embodiments thereof and examples, but it will be understood that variations and modifications can be effected within the spirit and scope of the invention.

What is claimed is:

1. An automation installation coupled to a computer, comprising:
    an interface, coupled to the computer for use in retrieving information about said automation installation and available in said automation installation, to call up a search engine stored in said automation installation and to select the information about said automation installation which is available in said automation installation based on at least one criterion prescribed as an alpha-numeric character string by the computer.

2. The automation installation as claimed in claim 1, wherein said interface also calls up at least one connection list.

3. The automation installation, as claimed in claim 2, wherein the connection list includes at least one of non-installation-specific operating functions, installation-specific operating functions and installation-specific details other than operating functions.

4. The automation installation as claimed in claim 3, wherein said interface also calls up a help function.

5. The automation installation as claimed in claim 4, wherein the interface also calls up an e-mail function.

6. The automation installation as claimed in claim 5, wherein said interface also stores a message in the automation installation, and retrieves the message for at least one of the computer and another computer which can be coupled to said automation installation during subsequent access to said automaton installation.

7. The automation installation as claimed in claim 6, wherein retrieval of the message is access-protected.

8. The automation installation system as claimed in claim 6, wherein retrieval of the message is not access-protected.

9. The automation installation as claimed in claim 6, wherein the message is automatically erased by the automation installation after a storage time has elapsed.

10. The automation installation as claimed in claim 6, wherein access to said automation installation by the computer is password-protected.

11. The automation installation as claimed in claim 10, wherein said automation installation stores messages about states of a technical installation controlled by said automation installation for retrieval by the computer via said interface.

12. The automation installation as claimed in claim 11, wherein said interface interfaces with the World Wide Web.

13. The automation installation as claimed in claim 12, wherein at least the search engine is integrated in a web portal.

14. A computer readable medium storing at least one program for controlling a processor in an automation installation, coupled to a computer, to perform a method comprising:
    calling up a search engine stored in said automation installation to search information about and said automation installation available in said automation installation; and
    selecting items of the information about said automation installation available in said automation installation based on at least one criterion prescribed as an alpha-numeric character string by the computer.

* * * * *